United States Patent
Gulati et al.

(10) Patent No.: US 12,026,679 B2
(45) Date of Patent: Jul. 2, 2024

(54) METHODS FOR ESTIMATING REPAIR DATA UTILIZING ARTIFICIAL INTELLIGENCE AND DEVICES THEREOF

(71) Applicant: Mitchell International, Inc., San Diego, CA (US)

(72) Inventors: Abhijeet Gulati, San Diego, CA (US); Ravi Nemani, San Diego, CA (US); Joseph Hyland, San Diego, CA (US); Prarit Lamba, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 471 days.

(21) Appl. No.: 16/585,468

(22) Filed: Sep. 27, 2019

(65) Prior Publication Data

US 2020/0104805 A1    Apr. 2, 2020

Related U.S. Application Data

(60) Provisional application No. 62/738,824, filed on Sep. 28, 2018.

(51) Int. Cl.
*G06Q 10/20* (2023.01)
*G06N 3/08* (2023.01)
(Continued)

(52) U.S. Cl.
CPC ............ *G06Q 10/20* (2013.01); *G06N 3/08* (2013.01); *G06Q 40/08* (2013.01); *G06V 20/10* (2022.01); *G07C 5/0808* (2013.01)

(58) Field of Classification Search
None
See application file for complete search history.

(56) References Cited

U.S. PATENT DOCUMENTS 5,432,904 A    7/1995   Wong
5,504,674 A    4/1996   Chen et al.
(Continued)

FOREIGN PATENT DOCUMENTS

WO    WO2017055878 A1 *   4/2017   ............... G06K 9/62
WO    WO2018055340 A1 *   3/2018   ............. G06Q 10/10

OTHER PUBLICATIONS

S. Albawi, T. A. Mohammed and S. Al-Zawi, "Understanding of a convolutional neural network," 2017 International Conference on Engineering and Technology (ICET), 2017, pp. 1-6, doi: 10.1109/ICEngTechnol.2017.8308186. (Year: 2017).*

(Continued)

*Primary Examiner* — Paul R Fisher
(74) *Attorney, Agent, or Firm* — Sheridan Ross P.C.

(57) ABSTRACT

A method, non-transitory computer readable medium, and an apparatus for automated estimation of repair data includes applying a first generated artificial intelligence model on a received vehicle damage image associated with an electronic claim to identify damaged component(s) on a vehicle without using any metadata. A heat map analysis is performed on the received actual vehicle damage image to identify a damage severity value associated with at least one of the identified damaged component(s). A second generated artificial intelligence model is applied on the received actual vehicle damage image and the damage severity value associated with the identified damaged component(s) to determine repair data and a repair-or-replace designation. The determined repair data and the determined repair-or-replace designation for at least one of the identified one or more damaged components is provided in response to the received actual vehicle damage image associated with the electronic claim.

21 Claims, 11 Drawing Sheets

(51) Int. Cl.
*G06Q 40/08* (2012.01)
*G06V 20/10* (2022.01)
*G07C 5/08* (2006.01)

(56) References Cited

U.S. PATENT DOCUMENTS

| | | | |
|---|---|---|---|
| 5,950,169 | A | 9/1999 | Borghesi et al. |
| 6,047,858 | A | 4/2000 | Romer |
| 6,107,399 | A | 8/2000 | Selley et al. |
| 6,381,561 | B1 | 4/2002 | Bomar, Jr. et al. |
| 6,470,303 | B2 | 10/2002 | Kidd et al. |
| 6,885,981 | B2 | 4/2005 | Bomar, Jr. et al. |
| 7,197,444 | B2 | 3/2007 | Bomar, Jr. et al. |
| 7,359,821 | B1 | 4/2008 | Smith et al. |
| 7,502,772 | B2 | 3/2009 | Kidd et al. |
| 7,698,086 | B2 | 4/2010 | Kidd et al. |
| 7,716,002 | B1 | 5/2010 | Smith et al. |
| 7,974,808 | B2 | 7/2011 | Smith et al. |
| 8,019,629 | B1 | 9/2011 | Medina, III et al. |
| 8,095,391 | B2 | 1/2012 | Obora et al. |
| 8,160,904 | B1 | 4/2012 | Smith |
| 8,239,220 | B2 | 8/2012 | Kidd et al. |
| 8,260,639 | B1 | 9/2012 | Medina, III et al. |
| 8,612,170 | B2 | 12/2013 | Smith et al. |
| 8,712,806 | B1 | 4/2014 | Medina, III et al. |
| 9,218,626 | B1 | 12/2015 | Haller, Jr. et al. |
| 9,228,834 | B2 | 1/2016 | Kidd et al. |
| 9,500,545 | B2 | 11/2016 | Smith et al. |
| 9,721,302 | B2 * | 8/2017 | Tofte ............... G06Q 40/08 |
| 9,721,400 | B1 | 8/2017 | Oakes, III et al. |
| 9,824,453 | B1 * | 11/2017 | Collins .................. G06T 7/60 |
| 9,846,093 | B2 | 12/2017 | Smith et al. |
| 9,886,771 | B1 * | 2/2018 | Chen ............... G06F 3/04845 |
| 10,339,728 | B1 | 7/2019 | Oakes, III et al. |
| 10,360,601 | B1 * | 7/2019 | Adegan ............ G06Q 30/0283 |
| 10,410,439 | B1 | 10/2019 | Gingrich et al. |
| 10,510,142 | B1 | 12/2019 | Dohner et al. |
| 10,713,717 | B1 * | 7/2020 | Hanson ............. G06Q 40/04 |
| 10,740,891 | B1 * | 8/2020 | Chen .................... G06T 7/001 |
| 10,805,068 | B1 * | 10/2020 | Leise ................... G06Q 40/08 |
| 10,810,677 | B1 * | 10/2020 | Brandmaier ....... H04N 5/23222 |
| 10,922,726 | B1 | 2/2021 | Nelson et al. |
| 10,937,103 | B1 * | 3/2021 | Marlow ............... G06Q 40/08 |
| 10,949,814 | B1 | 3/2021 | Nelson et al. |
| 2005/0267774 | A1 | 12/2005 | Merritt et al. |
| 2007/0185697 | A1 * | 8/2007 | Tan .......................... A61B 5/16 703/11 |
| 2013/0041693 | A1 * | 2/2013 | Thomas ................ G06Q 10/10 705/4 |
| 2014/0122130 | A1 | 5/2014 | Kelly et al. |
| 2015/0213556 | A1 | 7/2015 | Haller, Jr. et al. |
| 2015/0332355 | A1 * | 11/2015 | Kost ................... G06Q 30/0283 705/35 |
| 2016/0178465 | A1 | 6/2016 | Smith et al. |
| 2017/0132528 | A1 * | 5/2017 | Aslan .................... G06N 20/00 |
| 2017/0293894 | A1 * | 10/2017 | Taliwal ............. G06K 9/00671 |
| 2017/0352104 | A1 * | 12/2017 | Hanson ................. G06Q 40/08 |
| 2018/0082378 | A1 * | 3/2018 | Kelsh ................. G06Q 30/0283 |
| 2018/0095638 | A1 * | 4/2018 | Merg .................... G06F 3/0482 |
| 2018/0121888 | A1 * | 5/2018 | O'Reilly ............... G06F 16/27 |
| 2018/0300576 | A1 | 10/2018 | Dalyac et al. |
| 2018/0322623 | A1 * | 11/2018 | Memo ................... G06N 3/084 |
| 2020/0349370 | A1 * | 11/2020 | Lambert ............... G06V 20/20 |

OTHER PUBLICATIONS

Andrew G. Howard, "Some Improvements on Deep Convolutional Neural Network Based Image Classification", Cornell University, Computer Vision and Pattern Recognition (2013). (Year: 2013).*
Gustav Larsson et al., "FractalNet: Ultra-Deep Neural Networks Without Residuals", Published as a conference paper at ICLR 2017 (Year: 2017).*
Office Action in EP Patent Application No. 9200112.1, dated Jul. 28, 2021.
European Search Report and Opinion in European Patent Application No. 19200112.1, dated Feb. 26, 2020.

* cited by examiner

Learning Phase

Learning Phase

Repair data 700

| Vehicle 705 | Make 710 | Model 715 | Year 720 | Component 725 | Repair Cost 730 | Replacement Cost 735 | Labor Hours 740 | Severity 745 | Repair or Replace 750 |
|---|---|---|---|---|---|---|---|---|---|
| Sedan | Toyota | Corolla | 2019 | Front Bumper | $500 | $1500 | 2 hours | High | Replace |

FIG. 7

METHODS FOR ESTIMATING REPAIR DATA UTILIZING ARTIFICIAL INTELLIGENCE AND DEVICES THEREOF

This application claims the benefit of U.S. Provisional Patent Application Ser. No. 62/738,824, filed Sep. 28, 2018, which is hereby incorporated by reference in its entirety.

FIELD

This technology generally relates to methods for accurately estimating repair data utilizing artificial intelligence and devices thereof.

BACKGROUND

Providing an accurate estimate of the specific components for repairing one or more defects from damage to a vehicle of a customer is important and challenging. It also is necessary to provide an accurate parts list on a timely basis in order to permit the customer to make a selection on whether or not to repair the defects.

Prior technological solutions for assisting with providing estimates have generally been limited to software tools to capture and record input data and to limited on-line searching capabilities. With these limited prior tools, an inspector from a vehicle repair shop may type in notes while inspecting for damages or other defects to a vehicle. Additionally, the inspector may try to access reference materials, such as parts lists, manuals, handbooks or other online databases, to identify a list of parts for repairing each of the defects. For a vehicle with multiple damages or defects each of a different nature, such as coating defects, interior damages, or glass damages, the inspector has to search for and correctly identify and access the correct reference materials or databases which takes a significant amount of time and effort. Since different vehicles may require different repairing processes and procedures, repairing materials and labor, the inspector needs to generate information that is vehicle specific for coming up with an accurate list of the parts and labor required. This traditional process is laborious and time consuming and often leads to an inaccurate list of parts.

Some of the existing technologies have tried to automate the process of providing the list of the parts and the labor required by utilizing a combination of both images associated with damage of the vehicle along with a detailed summary of the damage. Accordingly, to identify the damage on the vehicle, existing technologies require the corresponding textual data. In other words, images of the damage vehicle by themselves are not sufficient to accurately identify damage to the vehicle. The dependency on the textual data associated with the images also result in incorrect identification of the damages because the textual data may not be accurately provided by the user. To date there has been no technological solution to adequately address this issue with accurately identifying the specific parts for a damaged vehicle without requiring textual data and user intervention.

SUMMARY

A method for automated estimating of repair data includes, applying, by a computing apparatus, a first generated artificial intelligence model on a received vehicle damage image associated with an electronic claim to identify one or more damaged components on a vehicle without using any metadata, the first generated artificial intelligence database is trained on prior vehicle damage images. Next, a heat map analysis is performed by the computing apparatus on the received actual vehicle damage image to identify a damage severity value associated with at least one of the identified one or more damaged components. Further, a second generated artificial intelligence model is applied, by the computing apparatus, on the received actual vehicle damage image and the damage severity value associated with at least one of the identified one or more damaged components to determine repair data and a repair-or-replace designation for at least one of the identified one or more damaged components. The determined repair data and the determined repair-or-replace designation for at least one of the identified one or more damaged components is provided, by the repair management computing apparatus, in response to the received actual vehicle damage image associated with the electronic claim.

A non-transitory computer readable medium having stored thereon instructions for automated estimating of repair data comprising executable code, which when executed by at least one processor, cause the processor to apply a first generated artificial intelligence model on a received vehicle damage image associated with an electronic claim to identify one or more damaged components on a vehicle without using any metadata, the first generated artificial intelligence database is trained on prior vehicle damage images. Next, a heat map analysis is performed on the received actual vehicle damage image to identify a damage severity value associated with at least one of the identified one or more damaged components. Further, a second generated artificial intelligence model is applied on the received actual vehicle damage image and the damage severity value associated with at least one of the identified one or more damaged components to determine repair data and a repair-or-replace designation for at least one of the identified one or more damaged components. The determined repair data and the determined repair-or-replace designation for at least one of the identified one or more damaged components is provided in response to the received actual vehicle damage image associated with the electronic claim.

A repair management computing apparatus includes a memory coupled to the processor which is configured to be capable of executing programmed instructions comprising and stored in the memory to apply a first generated artificial intelligence model on a received vehicle damage image associated with an electronic claim to identify one or more damaged components on a vehicle without using any metadata, the first generated artificial intelligence database is trained on prior vehicle damage images. Next, a heat map analysis is performed on the received actual vehicle damage image to identify a damage severity value associated with at least one of the identified one or more damaged components. Further, a second generated artificial intelligence model is applied on the received actual vehicle damage image and the damage severity value associated with at least one of the identified one or more damaged components to determine repair data and a repair-or-replace designation for at least one of the identified one or more damaged components. The determined repair data and the determined repair-or-replace designation for at least one of the identified one or more damaged components is provided in response to the received actual vehicle damage image associated with the electronic claim.

Accordingly, this technology provides methods, non-transitory computer readable medium, and apparatuses that accurately automate estimating repair data. To efficiently and effectively automate this process, examples of this technology apply a generated artificial intelligence model that has been revised and refined based on feedback received from an inference phase. For example, the claimed technology advantageously utilize an artificial intelligence model that enables identifying damages to a vehicle directly from vehicle damage images and without requiring associated textual information, such as metadata. Other examples of advantages of the disclosed technology include utilization of a heat map analysis to enable an automated and consistent determination of a repair-or-replace designation for each damaged component in real-time or near real time without requiring any user intervention.

BRIEF DESCRIPTION OF THE DRAWINGS

FIG. 7 is an exemplary table illustrating the repair data used during the learning phase;

DETAILED DESCRIPTION

Figure 1:
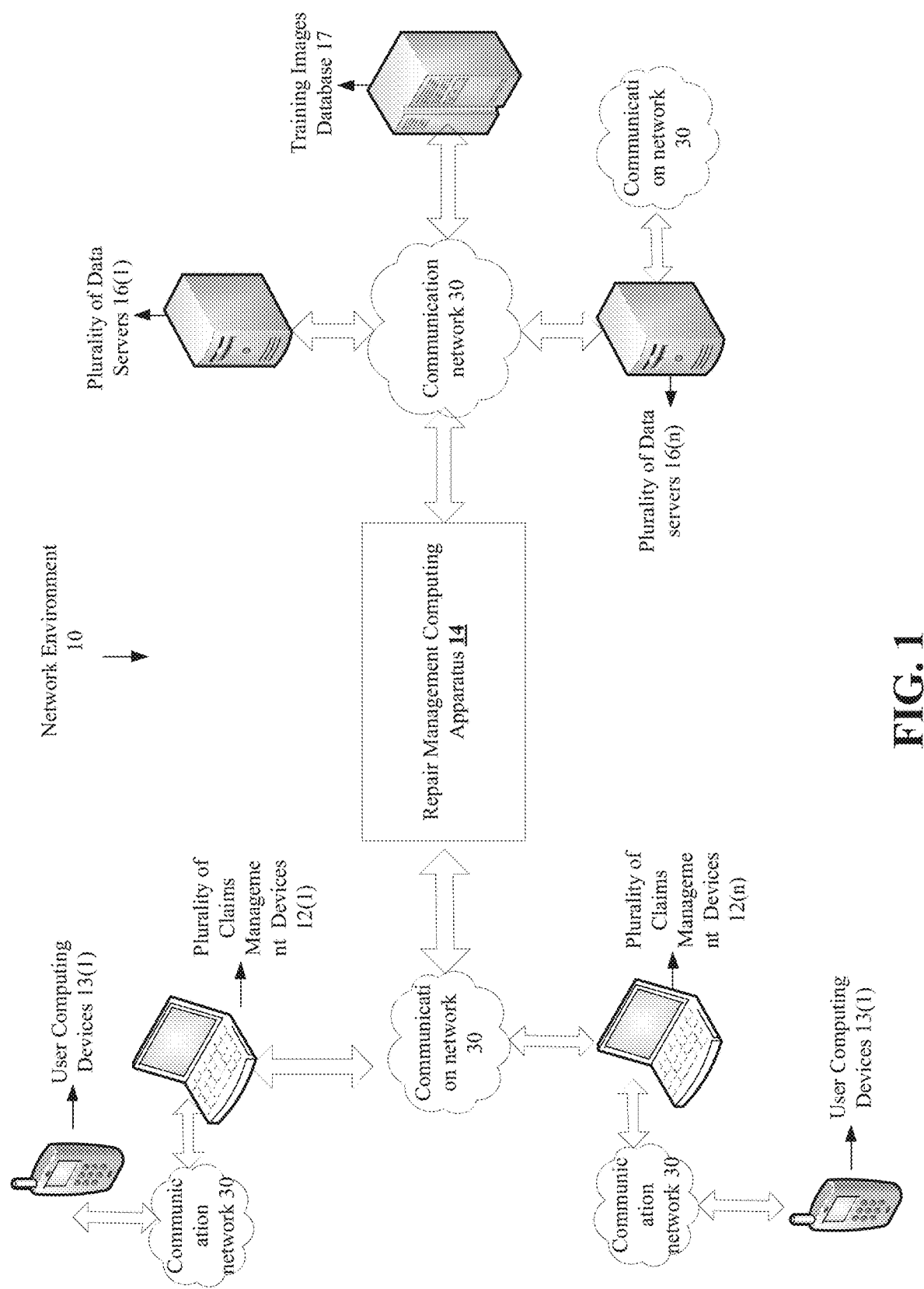
FIG. 1 is a block diagram of an environment with an example of a repair management computing apparatus that manages estimation of repair data utilizing artificial intelligence.
Figure 2:
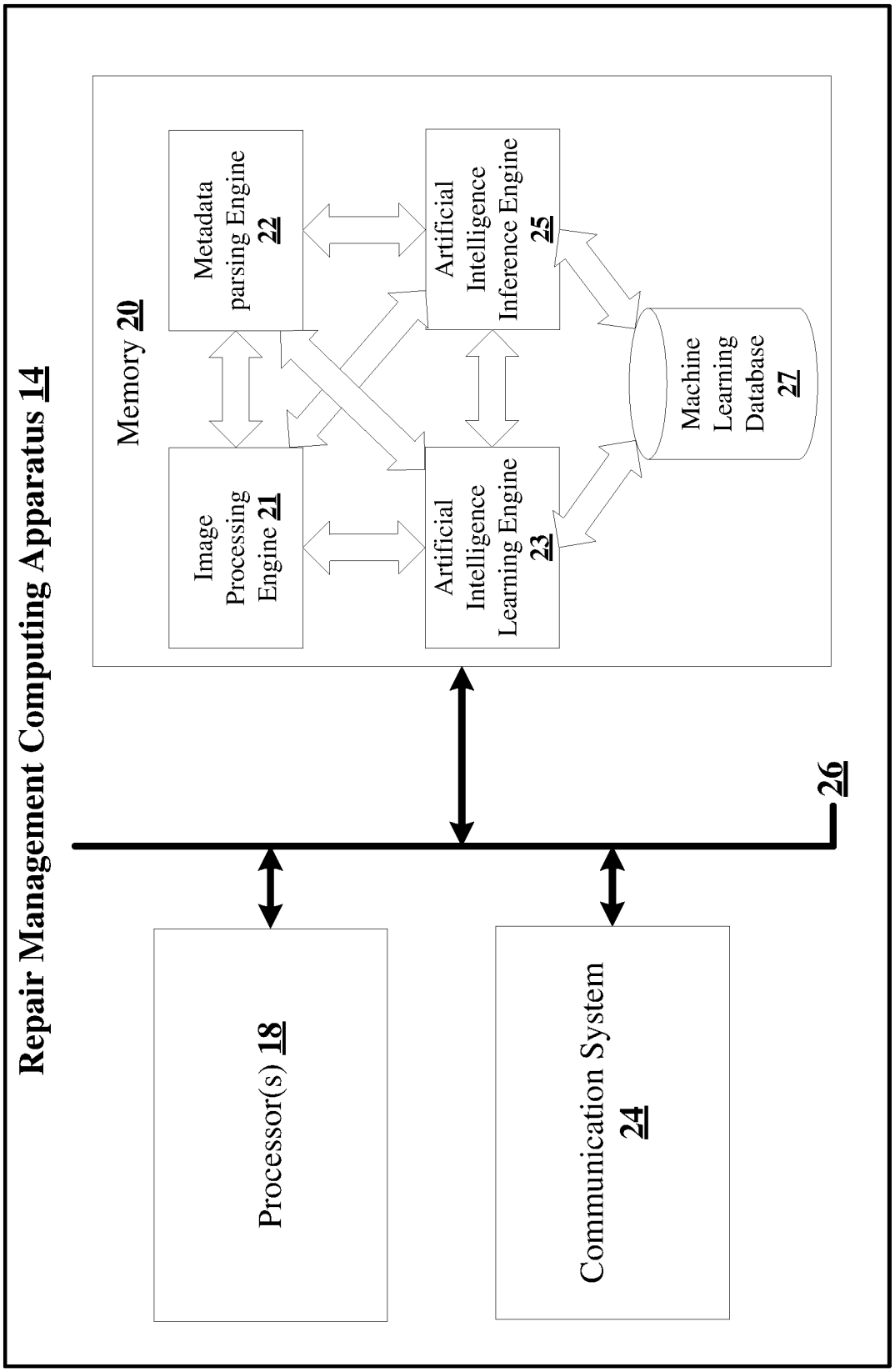
FIG. 2 is a block diagram of the example of the repair management computing apparatus shown in FIG. 1.

An environment 10 with an example of a repair management computing apparatus 14 is illustrated in FIGS. 1-2. In this particular example, the environment 10 includes the repair management computing apparatus 14, plurality of claims management devices 12(1)-12(n), plurality of user computing devices 13(1)-13(n), plurality of insurance data servers 16(1)-16(n), and a training images database 17 coupled via one or more communication networks 30, although the environment could include other types and numbers of systems, devices, components, and/or other elements as is generally known in the art and will not be illustrated or described herein. This technology provides a number of advantages including providing methods, non-transitory computer readable medium, and apparatuses that more accurately manage generation of repair estimation data, such as required labor hours, part price, and rate as well as a repair-or-replace designation, with artificial intelligence and a heat map analysis.

Referring more specifically to FIGS. 1-2, the repair management computing apparatus 14 is programmed to more accurately manage repair estimation data, such as required labor hours, part price, and rate as well as a repair-or-replace designation, with artificial intelligence and a heat map analysis, although the apparatus can perform other types and/or numbers of functions or other operations and this technology can be utilized with other types of claims. In this particular example, the repair management computing apparatus 14 includes a processor 18, a memory 20, and a communication system 24 which are coupled together by a bus 26, although the repair management computing apparatus 14 may comprise other types and/or numbers of physical and/or virtual systems, devices, components, and/or other elements in other configurations.

The processor 18 in the repair management computing apparatus 14 may execute one or more programmed instructions stored in the memory 20 for more accurately manage repair estimation data, such as required labor hours, part price, and rate as well as a repair-or-replace designation, with artificial intelligence and a heat map analysis as illustrated and described in the examples herein, although other types and numbers of functions and/or other operations can be performed. The processor 18 in the repair management computing apparatus 14 may include one or more central processing units and/or general purpose processors with one or more processing cores, for example.

The memory 20 in the repair management computing apparatus 14 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 18, can be used for the memory 20. Additionally as illustrated in FIG. 2, memory 20 comprises an image processing engine 21, metadata parsing engine 22, artificial intelligence learning engine 23, artificial intelligence inference engine 25, and the machine learning database 27, although the memory 20 can include other types or amounts of modules or components that would assist the repair management computing apparatus 14 with accurately estimating repair data using artificial intelligence. In this example, the image processing engine 21 assists with processing the received image(s) associated with a damage or repair of a vehicle, although the image processing engine 21 can be configured to perform other types or amounts of activities. Further in this example, the image processing engine 21 scans the received image(s) to identify the damage(s) on the vehicle, the severity of the damage(s), type of damage(s), although the image processing engine 21 can scan the received image to identify other types or amounts of information. By way of example, the image processing engine 21 can use algorithms, such as pattern recognition, independent component analysis, convolutional neural networks, and principal components analysis, while scanning the received image, although the image processing engine 21 can use other types or amounts of algorithms. Additionally in this example, the image processing engine 21 also assists with performing a severity of the damage analysis on the received image(s) by analyzing the heat map of the image(s) to determine a repair-or-replace designation, although the image processing engine 21 can use other techniques to identify the severity of the damage.

Next, the metadata parsing engine 22 within the memory 20 assists with parsing the metadata associated with a received image(s), although the metadata parsing engine 22 can be configured to perform other functions. In this example, the metadata parsing engine 22 can identify the data such as make of the vehicle, model of the vehicle, year of the make and model of the vehicle, damage described in the line item of the claim, although the metadata parsing engine 22 can identify other types or amounts of information.

Next, the artificial intelligence learning engine 23 within the memory 20 assists with machine learning of the damages and the severity of the damages using neural networks and/or convolution neural networks (CNN) (wherein CNN is a type of neural network structure, and a subpart of neural networks), although the artificial intelligence learning engine 23 can use other techniques to identify the damage(s) and the severity of the damage(s). In this example, the artificial intelligence learning engine 23 receives the input from the image processing engine 21 and the metadata parsing engine 22 as inputs to the neural networks and the CNN and assists with identifying the component, make, model, repair cost, labor data, and a decision of whether to repair or replace the component, although the artificial intelligence learning engine 23 can be configured to perform other functions. Furthermore in this example, the memory 20 includes an artificial intelligence inference engine 25 that assists with using the learning data from the artificial intelligence learning engine to component, make, model, repair cost, labor data, and a decision of whether to repair or replace the component for a provided image without requiring metadata, although the artificial intelligence inference engine 25 can be configured to perform other types or amounts of functions. Additionally, the machine learning database 27 within the memory can be used to store the artificial intelligence model or the learning of the artificial intelligence learning engine 23, although the machine learning database 27 can store other types or amounts of data. The artificial intelligence model stored in the machine learning database 27 can be further used by the artificial intelligence inference engine 25 to assist with accurately estimating the repair data in real-time.

The communication system 24 in the repair management computing apparatus 14 operatively couples and communicates between one or more of the plurality of claims management devices 12(1)-12(n), one or more of the plurality of insurance data servers 16(1)-16(n), and the training images database 17 which are all coupled together by one or more of the communication networks 30, although other types and numbers of communication networks or systems with other types and numbers of connections and configurations to other devices and elements. By way of example only, the communication networks 30 can use TCP/IP over Ethernet and industry-standard protocols, including NFS, CIFS, SOAP, XML, LDAP, SCSI, and SNMP, although other types and numbers of communication networks, can be used. The communication networks 30 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the plurality of claims management devices 12(1)-12(n) may electronic claims associated with damage(s) to a vehicle to receive an estimation of the repair data such as labor hours, part price, or rate, operation code of an item, such as a vehicle panel, although the plurality of claims management devices 12(1)-12(n) can send other types or amounts of in other manners and/or from other sources. Each of the plurality of claims management devices 12(1)-12(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements.

Each of the plurality of user computing devices 13(1)-13(n) may include a processor, a memory, user input device, such as a keyboard, mouse, and/or interactive display screen by way of example only, a display device, and a communication interface, which are coupled together by a bus or other link, although each may have other types and/or numbers of other systems, devices, components, and/or other elements. In this example, each of the plurality of user computing devices 13(1)-13(n) can submit one or more images of a vehicle damage along with an insurance claim to the plurality of claims management devices 12(1)-12(n), although the plurality of user computing devices 13(1)-13(n) can submit other types or amounts of information.

The plurality of insurance data servers 16(1)-16(n) may store and provide data to more accurately estimation repair data, such as required labor hours, part price, and labor rate, and an operation code, to the repair management computing apparatus 14 via one or more of the communication networks 30, for example, although other types and/or numbers of storage media in other configurations could be used. In this particular example, each of the plurality of insurance data servers 16(1)-16(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of insurance data servers 16(1)-16(n) and may transmit data in response to requests from the repair management computing apparatus 14. Each the plurality of insurance data servers 16(1)-16(n) may include a processor, a memory, and a communication interface, which are coupled together by a bus or other link, although each may have other types and/or numbers of other systems, devices, components, and/or other elements.

Further in this example, the training images database 17 may include a processor, a memory, and a communication interface, which are coupled together by a bus or other link, although each may have other types and/or numbers of other systems, devices, components, and/or other elements. The training images database 17 provides the training images of vehicle damage necessary to build, train, and refine the artificial intelligence database 27, although the training images database 17 can include other types or amounts of information. In this particular example, training images database 17 may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the training images database 17 and may transmit data in response to requests from the repair management computing apparatus 14.

Although the exemplary network environment 10 with the repair management computing apparatus 14, the plurality of claims management devices 12(1)-12(n), the plurality of user computing devices 13(1)-13(n), the plurality of insurance data servers 16(1)-16(n), the training images database 17, and the communication networks 30 are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
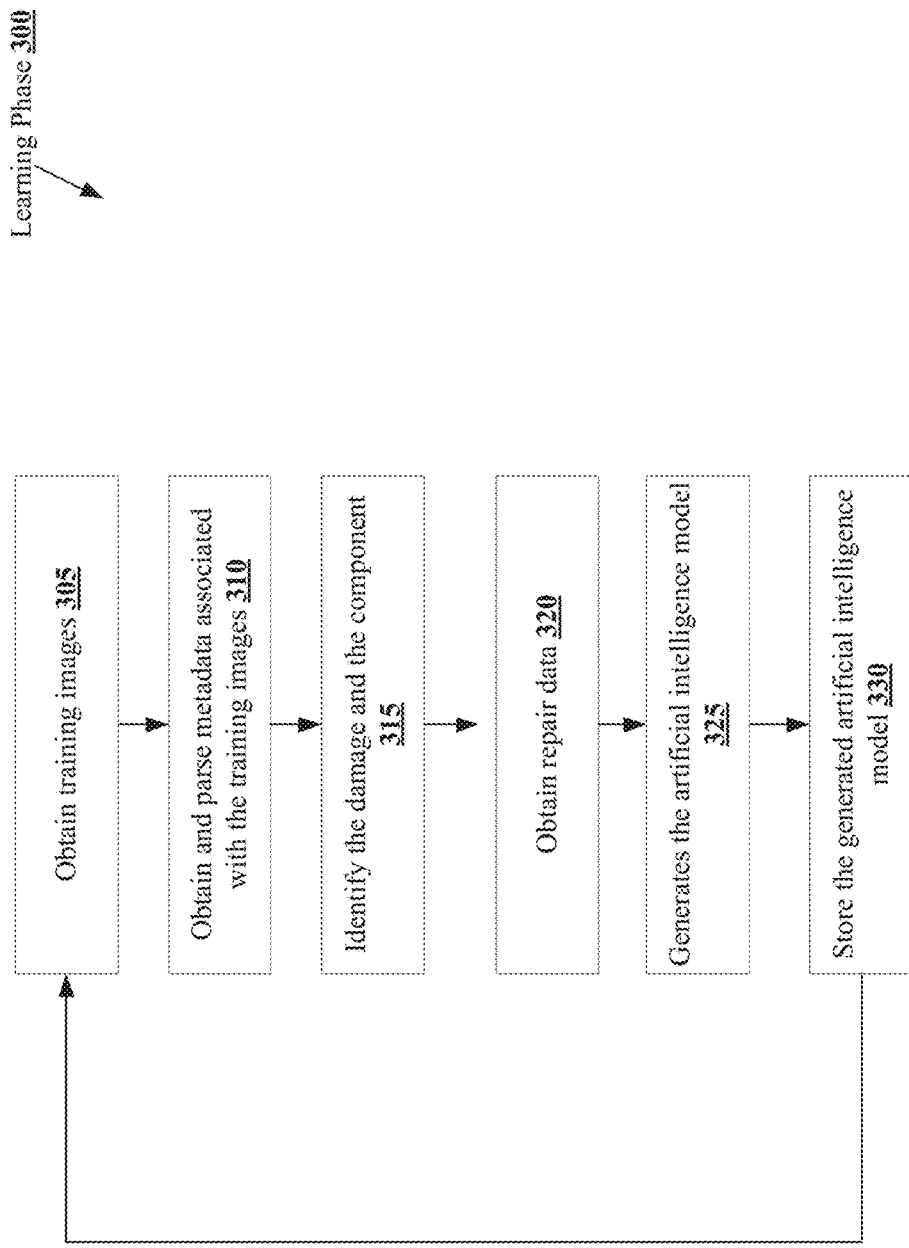
FIG. 3 is a flowchart of an example of a method for training artificial intelligence to manage estimation of repair data.
Figure 4B:
FIGS. 4A-4B are exemplary training vehicle damage images.
Figure 4A:

An example of a method for managing repair estimation data, such as required labor hours, part price, and rate, with artificial intelligence will now be described with reference to FIGS. 1-11. Referring more specifically to FIG. 3, an example of a method for training artificial intelligence to manage estimation of repair data is illustrated. In step 305, the image processing engine 21 within the repair management computing apparatus 14 obtains a plurality of training vehicle damage images from the training images database 17, although the repair management computing apparatus 14 can receive the image from other devices, such as the plurality of insurance data servers 16(1)-16(n), and can receive images of other types of items. In this example, each of the plurality of vehicle damage images includes a picture of a damaged component of a vehicle, although the vehicle damage images can include other types of information. By way of example, FIG. 4A and FIG. 4B illustrate examples of two vehicle damage images: first training image 405; and the second training image 410, although the repair management computing apparatus 14 can include other types and/or numbers of training images.

Figures 5A, 5B:
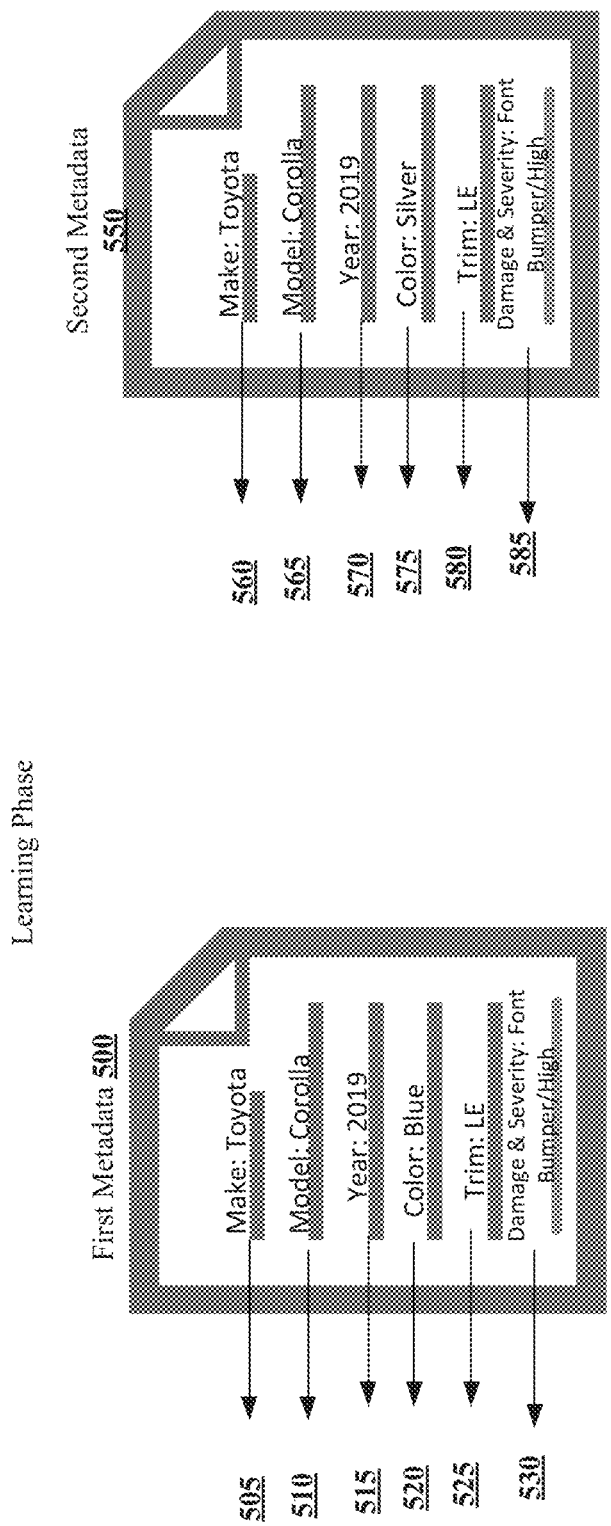
FIGS. 5A-5B are exemplary metadata used in a learning phase.

Next in step 310, the metadata parsing engine 22 within the repair management computing apparatus 14 obtains and parses the metadata out of each of the obtained plurality of training vehicle damage images. In this example, the exemplary parsed metadata from each of the plurality of training images is illustrated in FIGS. 5A and 5B. In this example, the first metadata 500 in FIG. 5A for the first training image 405 shown in FIG. 4A includes metadata on the make 505, model, 510, year 515, color 520, trim 525, and the description of the damage and the severity 530, although each of the images may have other types and/or numbers of metadata. Similarly, the second metadata 500 in FIG. 5B for the second training image 410 shown in FIG. 4B includes metadata on the make 560, model 656, year 570, color 575, trim 580, and description of the damage and the severity of the damage 585, although each of the images may have other types and/or numbers of metadata.

Figure 6B:
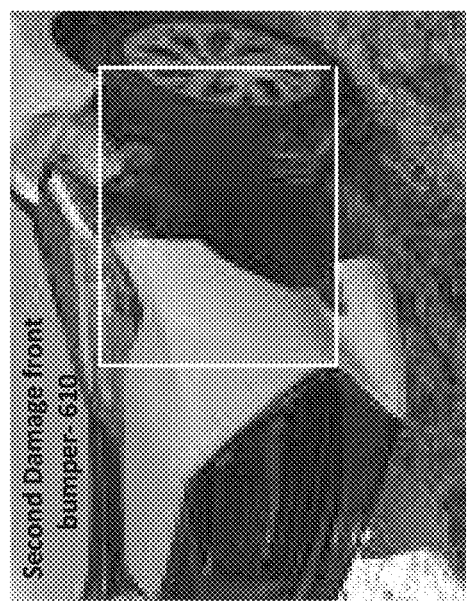
FIGS. 6A-6B are exemplary images with the detected damage to the components during the learning phase.
Figure 6A:
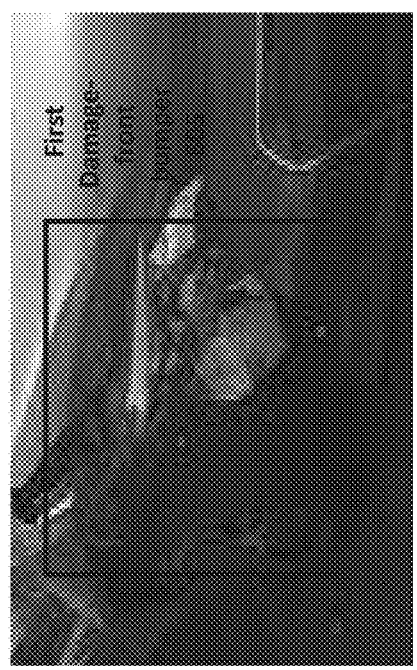

In step 315, the image processing engine 21 within the repair management computing apparatus 14 processes the obtained plurality of training vehicle damage images to identify the damaged component(s), although other types or amounts of damages may be identified. In this example, the image processing engine 21 within the repair management computing apparatus identifies the make, model, and year of the vehicle to obtain the corresponding vehicle data and the specifications from one of the plurality of data servers 16(1)-16(n) and the specifications are then used to compare against the obtained training images to identify the damage. By way of example, the image processing engine 21 within the repair management computing apparatus 14 identifies the make of the car as Toyota®, model as Corolla, and the year of vehicle as 2019 from the metadata. Next, the image processing engine 21 within the repair management computing apparatus 14 obtains the vehicle data and the specifications data which may include images to compare against the first training image 405 to identify damage to the front bumper 605 in the first training image as illustrated in FIG. 6A. The first damage to the front bumper 605 identified by the image processing engine 21 correlates to the description of the damage 530 described in the first metadata 500 associated with the first training image 405. Similarly, the image processing engine 21 within the repair management computing apparatus 14 identifies damage to the front bumper 610 illustrated in FIG. 6B.

Next in step 320, the artificial intelligence learning engine 23 within the repair management computing apparatus 14 obtains stored repair data on the actual completed repair performed on the vehicle based on the extracted metadata from one of the plurality of insurance data servers 16(1)-16(n), although the artificial intelligence learning engine 23 within the repair management computing apparatus 14 can obtain this historical repair data from other locations or sources. In this example, the artificial intelligence learning engine 23 within the repair management computing apparatus 14 uses the vehicle make, model, year, and the identified damages to the component(s) to obtain the corresponding repair from one of the plurality of insurance data servers 16(1)-16(n), although other techniques can be used to obtain the corresponding repair data. By way of example, FIG. 7 illustrates repair data 700 associated with the first training image 405 and the second training image 410. In this example, the repair data 700 includes data on a type of vehicle 705, make of the vehicle 710, a model of the vehicle 715, a year of the model 720, a damaged component 725, a repair cost 730, a replacement cost 735, labor hours 740, a severity of damage rating 745, and a designation of whether to repair-or-replace 750 or other operation codes (such as total loss), although the repair data 700 can include other types data associated with the repair that was performed on the damage to the front bumper 605 (illustrated in FIG. 6A) and the damage to the front bumper 610 (illustrated in FIG. 6B).

In step 325, the artificial intelligence learning engine 23 within the repair management computing apparatus 14 generates an artificial intelligence model by correlating the identified damage to the component(s) and the repair data to the corresponding obtained plurality of plurality of training vehicle damage images, although the artificial intelligence model can be developed using other techniques. In other words, the steps 305 to 320 illustrate and describe assisting with generating a trained artificial intelligence model for determining repair data from image(s) without metadata.

Next in step 330, the artificial intelligence learning engine 23 within the repair management computing apparatus 14 stores the generated artificial intelligence model into the machine learning database 27, although the artificial intelligence learning engine 23 within the repair management computing apparatus 14 can store other types or amounts of data at other locations. The exemplary flow proceeds back to step 305 where the image processing engine 21 within the repair management computing apparatus 14 receives a subsequent plurality of training vehicle damage images to further refine the machine learning phase 300.

Additionally in this example, the artificial intelligence learning engine 23 within the repair management computing apparatus 14 refines the generated artificial intelligence model by learning to identify damage and the associated repair data using the images, the metadata, and the associated historic repair data along with techniques, such as neural networks and/or convolution neural networks (CNN). After processing multiple iterations training vehicle damage images along with metadata, vehicle data, and the technical specifications, the artificial intelligence learning engine 23 within the repair management computing apparatus 14 can accurately identify damage in images of a vehicle and accurately identify the make, model, damaged component, labor price, and the replace-or-repair designation or a total loss designation with the heat map analysis.

Figure 8:
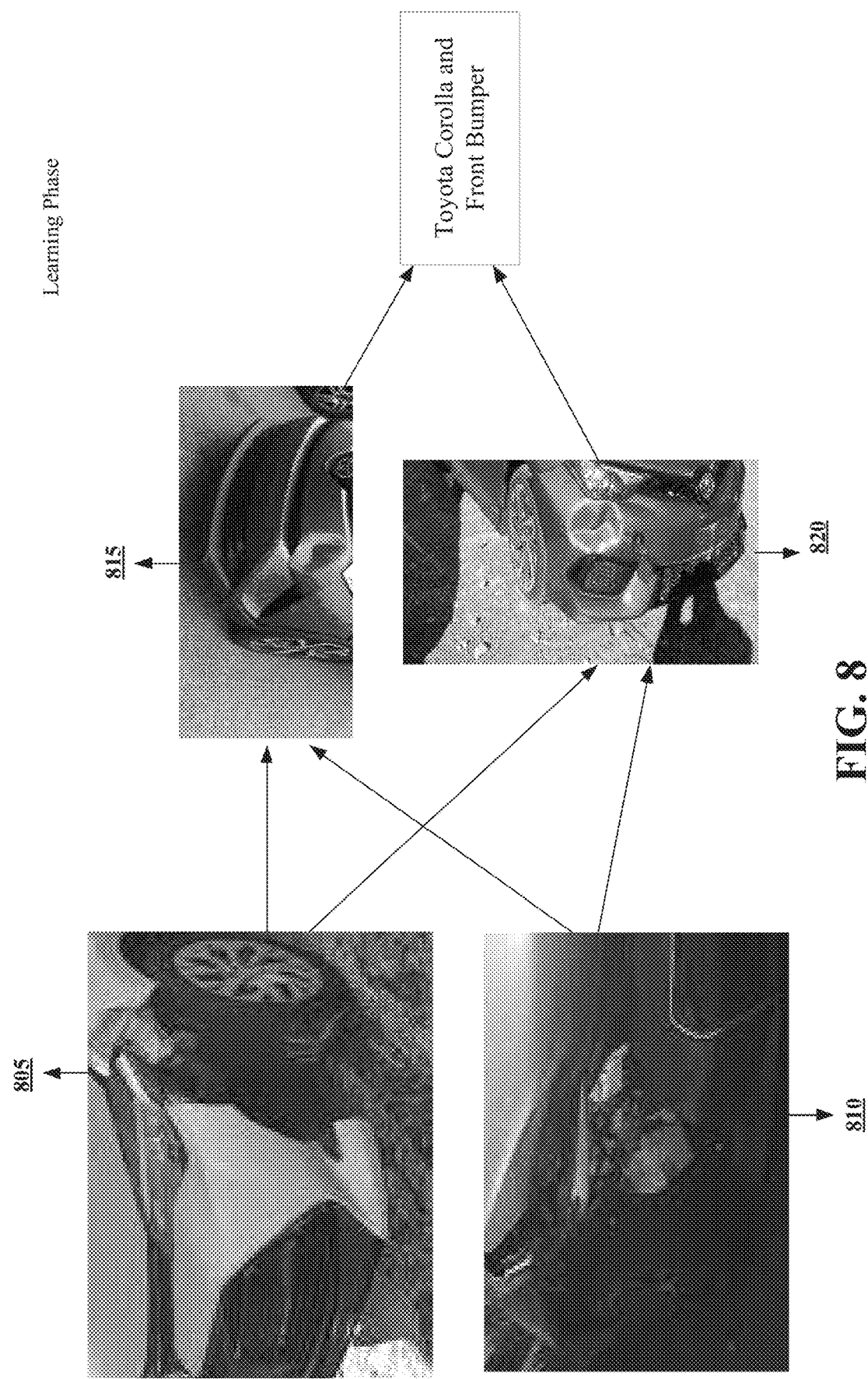
FIG. 8 are exemplary images used to develop machine learning using convolutional neural network techniques.

An example of the artificial intelligence learning engine 23 within the repair management computing apparatus 14 refining the generated artificial intelligence model using the convolution neural network technique is illustrated in FIG. 8. For example, the artificial intelligence learning engine 23 within the repair management computing apparatus 14 learns to identify the make, mode, year, damaged component, as illustrated above for the training images 805 and 810. Next, the artificial intelligence learning engine 23 within the repair management computing apparatus 14 applies the learning from the training images 805 and 810 to the training images 815 and 820. In this example, the training images 815 and 820 are captured at different angles and so the artificial intelligence learning engine 23 within the repair management computing apparatus 14 first rotates the training images 815 and 820 similar to training images 805 and 810 and then learns to identify the make, mode, year, and damaged component, severity of the damage, damage type, part price, labor hours, and labor rate as illustrated. Although, the artificial intelligence learning engine 23 within the repair management computing apparatus 14 can apply numerous transformation functions such as mirroring or contrast reducing or increasing on the training images to identify the make, mode, year, and damaged component. After several iterations of learning, the artificial intelligence learning engine 23 within the repair management computing apparatus 14 is able to accurately identify the images associated with the front bumper of the Corolla. In other words, the artificial intelligence learning engine 23 within the repair management computing apparatus 14 is able to map the inputs of training images such as 805, 810, 815, and 820 to a Toyota® Corolla with a damaged front bumper. By using the above illustrated technique, artificial intelligence learning engine 23 within the repair management computing apparatus 14 is able to generate a refined artificial intelligence model when compared to the artificial intelligence model generated in step 325. Additionally, the refined artificial intelligence model is also stored in the machine learning database 27, although the refined artificial intelligence model can be stored at other memory locations.

Figure 9:
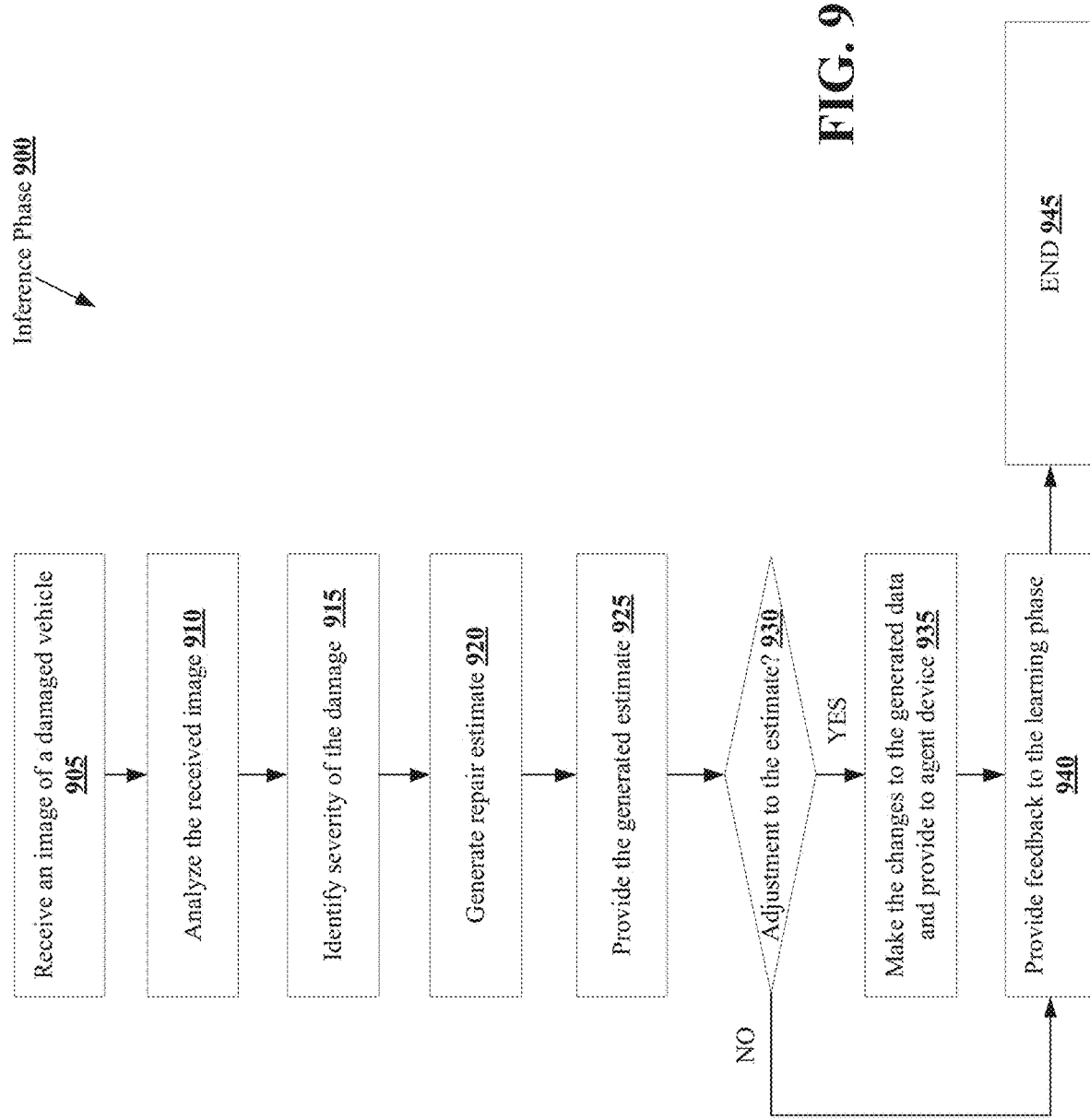
FIG. 9 is a flowchart of an example of a method for using the developed artificial intelligence to accurately estimate repair data.
Figure 10:
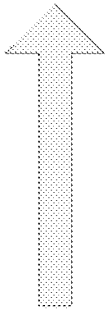
FIG. 10 is an exemplary flow diagram illustrating the inference phase.
Figure 10:

Now, an exemplary method for using the machine learning phase 300 to provide an accurate estimate of the repair data will now be illustrated in the inference phase 900 with reference to FIG. 9. In step 905, the image processing engine 21 within the repair management computing apparatus 14 receives one or more vehicle damage images within an electronic claim from one of the plurality of claims management devices 12(1)-12(n), although the repair management computing apparatus 14 can receive other the image(s) from other sources and may receive other types or amounts of data, such as textual data associated with the damaged vehicle. In this example, one of the plurality of user computing devices 12(1)-12(n) submits one or more images associated with a vehicle damage along with the related data as an electronic claim to one of the plurality of claims management devices 12(1)-12(n). Further, the receiving one of the plurality of claims management devices 12(1)-12(n) forwards only the received vehicle damage image(s) to the image processing engine 21 within the repair management computing apparatus 14. An example of the received image is illustrated in FIG. 10 as the vehicle damage image 1000. In this example, the electronic claim can include other types or amounts of data associated with the damaged vehicle and/or the component.

Next in step 910, the artificial intelligence inference engine 25 within the repair management computing apparatus 14 analyzes the received one or more images to identify the damage(s), the component damaged, the make, model, and year of manufacture, based on the refined artificial intelligence model in the machine learning database 27. Although the artificial intelligence inference engine 25 within the repair management computing apparatus 14 in another example, can use other parameters available at the time of inference phase 900 such as geo location of the images, techniques, or data to identify the damage(s), the component damaged, the make, model, year of manufacture, severity of the damage. In the inference phase 900, the artificial intelligence inference engine 25 within the repair management computing apparatus 14 does not require the metadata illustrated in FIG. 5A and FIG. 5B of the learning phase 300 to identify the damage(s), the component damaged, the make, model, and year of manufacture, and severity of the damage. In other words, just the received one or more vehicle damage images is sufficient to identify the damage to the component(s), the make, model, and year of manufacture, and the disclosed technology is able to accurately identify the aforementioned parameters based on the refined artificial intelligence model.

Figure 11A:
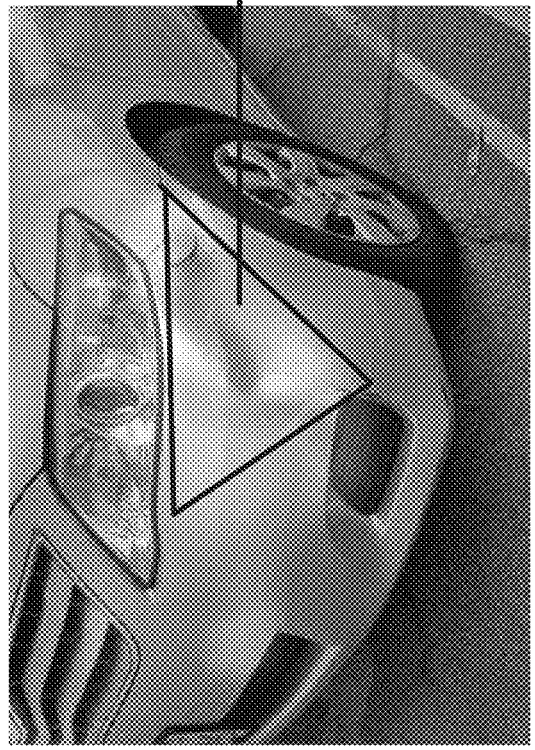
FIGS. 11A-11B are exemplary images illustrating heat map of the damaged component(s)
Figure 11B:
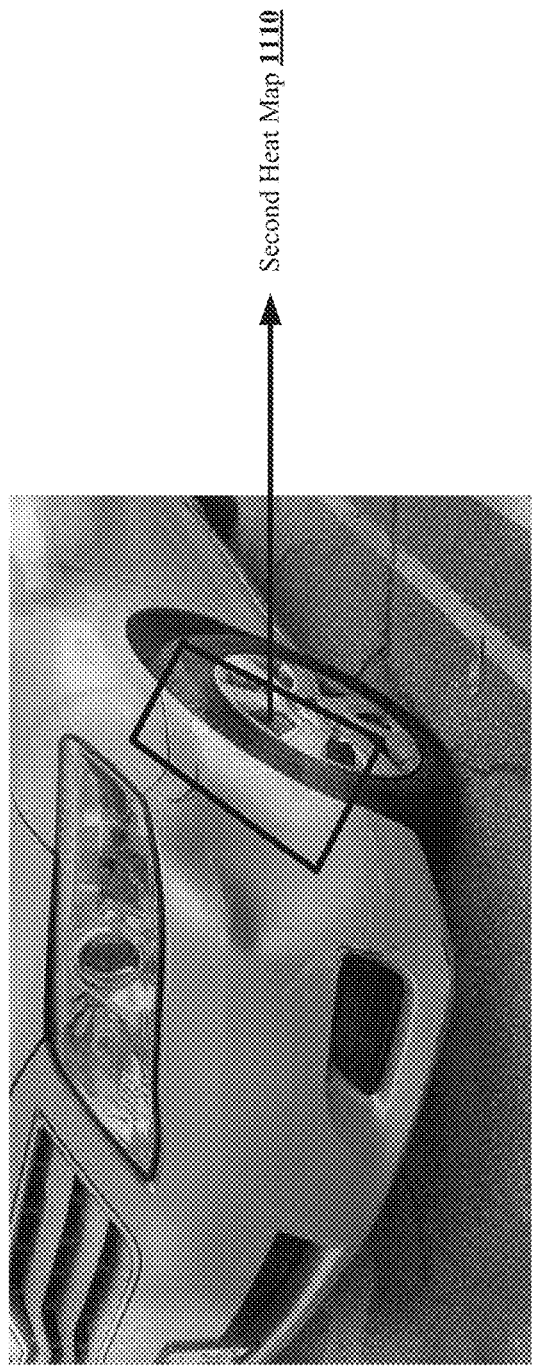

Next in step 915, the image processing engine 21 within the repair management computing apparatus 14 identifies the severity of the damage for each of the one or more vehicle damage images. By way of example, FIG. 11A illustrates a first heat map 1105 associated with the first damage to the front bumper and FIG. 11B illustrates a second heat map 1110 associated with the second damage to the front bumper. In this example, the image processing engine 21 within the repair management computing apparatus 14 can use any existing heat map detection algorithms to analyze the images and identify the heat map, that can be recognized by a person having ordinary skill in the art. In this example, heat map includes a graphical representation of localized area of damage, although the heat map can include other types or amounts of information. In this example, a darker shade illustrated in in the first heat map 1105 relates to severe damage to the component (front bumper in this example) and a lighter shade of the first heat map relates to less severe damage to the component. Accordingly, if substantial portion of the heat map (as illustrated in FIG. 11A first heat map 1105) of the component is of darker shade, then the image processing engine 21 within the repair management computing apparatus 14 identifies that the component is severely damaged and therefore has to be replaced due to a total loss. On the contrary, if substantial portion of the heat map is of a lighter shade, then the image processing engine 21 within the repair management computing apparatus 14 would determine that the component has not been severely damaged and therefore could be repaired.

In step 920, the artificial intelligence inference engine 25 within the repair management computing apparatus 14 generates a repair estimate, replacement estimate, labor hours, and a decision regarding whether the damaged component is to be repaired, replaced, or other types of operations for the identified damage(s) to the component, although the artificial intelligence inference engine 25 within the repair management computing apparatus 14 can generate other types or amounts of information. An example of the generated estimate 1005 is illustrated in FIG. 10. In the inference phase 900, the artificial intelligence inference engine 25 within the repair management computing apparatus 14 does not require the repair data 700 illustrated in FIG. 7 of the learning phase 300 to generate the repair estimate, replacement estimate, labor hours, and a decision regarding whether the damaged component is to be repaired or replaced for the identified damage(s) to the component. In other words, just the received one or more vehicle damage images is sufficient to generate the repair estimate, replacement estimate, labor hours, and a decision regarding whether the damaged component is to be repaired or replaced for the identified damage(s) to the component, and the disclosed technology is able to accurately generate the aforementioned data based on the refined machine learning developed during the learning phase 300. Additionally, the disclosed technology not only identifies the severity of the damage to the component, but is also able to provide the necessary determination of the repair-or-replace designation for the damaged component.

In step 925, the artificial intelligence inference engine 25 within the repair management computing apparatus 14 provides the generated repair estimate, replacement estimate, and a decision regarding whether the damaged component is to be repaired or replaced in this example to the requesting one of the plurality of claims management devices 12(1)-12(n), although the artificial intelligence inference engine 25 within the repair management computing apparatus 14 can provide the generated repair estimate, replacement estimate, and a decision in other formats and to other systems or devices. In this example, the artificial intelligence inference engine 25 within the repair management computing apparatus 14 generates a graphical user interface including the generated repair estimate, replacement estimate, and a decision regarding whether the damaged component is to be repaired or replaced for the identified damage(s) to the component, and provides the generated data via the generated graphical user interface. Although, the artificial intelligence inference engine 25 within the repair management computing apparatus 14 can provide the generated data using other techniques.

In step 930, the artificial intelligence inference engine 25 within the repair management computing apparatus 14 determines when there are any adjustments required to the generated repair estimate, replacement estimate, labor hours, and a decision regarding whether the damaged component is to be repaired or replaced. In this example, if there are any adjustments required to the generated data, the artificial intelligence inference engine 25 within the repair management computing apparatus 14 receives the adjustments from the requesting one of the plurality of claims management devices 12(1)-12(n) on the graphical user interface, although the adjustments can be received by other techniques. Similarly, if there are no adjustments required, the artificial intelligence inference engine 25 within the repair management computing apparatus 14 receives a confirmation from the requesting one of the plurality of claims management devices 12(1)-12(n) on the graphical user interface, although the confirmation can be received using other techniques. Accordingly, when the artificial intelligence inference engine 25 within the repair management computing apparatus 14 determines that there are further adjustments required, then the Yes branch is taken step 935.

In step 935, the artificial intelligence inference engine 25 within the repair management computing apparatus 14 makes the necessary changes to the generated repair estimate, replacement estimate, labor hours, and a decision regarding whether the damaged component is to be repaired or replaced based on the adjustments received from the requesting one of the plurality of claims management devices 12(1)-12(n). After making the adjustments, the artificial intelligence inference engine 25 within the repair management computing apparatus 14 then provides the revised repair estimate, replacement estimate, labor hours, and a decision regarding whether the damaged component is to be repaired or replaced based on the adjustments to the requesting one of the plurality of claims management devices 12(1)-12(n) via the graphical user interface, although other the revised changes can be provided using other techniques. The exemplary flow proceeds to step 940 which will be further illustrated below.

However, if back in step 930, when the artificial intelligence inference engine 25 within the repair management computing apparatus 14 determines that no further changes are required, then the No branch is taken to step 940. In step 940, the artificial intelligence inference engine 25 within the repair management computing apparatus 14 sends the no adjustment instruction to the refined artificial intelligence model indicating that the generated repair estimate and decision regarding whether the damaged component is to be repaired or replaced was accurate. In another example, when the artificial intelligence inference engine 25 within the repair management computing apparatus 14 receives the adjustments to the generated repair estimate and the decision regarding whether the damaged component is to be repaired or replaced, an adjustment instruction is sent back to the refined artificial intelligence model indicating that the generated repair estimate and decision regarding whether the damaged component is to be repaired or replaced was not accurate. Based on the feedback, the disclosed technology is able to further refine the machine learning to make the estimation of repair data more accurate by using that as an input while further training the machine learning model. By way of example, if the no adjustment instruction was provided to the artificial intelligence model, then the artificial intelligence inference engine 25 within the repair management computing apparatus 14 would provide a substantially similar repair estimate and the decision regarding whether the damaged component is to be repaired or replaced when a subsequent image(s) substantially similar to the image in 905 is received. In contrast, if the adjustment instruction was provided to the artificial intelligence model, then the artificial intelligence inference engine 25 within the repair management computing apparatus 14 would provide repair estimate and the decision regarding whether the damaged component is to be repaired or replaced substantially similar to the adjustment that was received in step 930 when a subsequent image(s) substantially similar to the image in 905 is received. The exemplary method ends at step 945.

Accordingly, this technology provides methods, non-transitory computer readable medium, and apparatuses that accurately automates estimating repair data. To efficiently and effectively automate this process, examples of this technology applies a generated artificial intelligence model that has been revised and refined based on feedback received from an inference phase. For example, the claimed technology advantageously utilize the artificial intelligence model that enables identifying damages to the vehicle using vehicle damage images and without requiring textual information such as metadata. Other examples of advantages of the disclosed technology include a heat map analysis to provide a repair-or-replace designation for each damaged component in real-time or near real-time without requiring any user intervention.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for automated estimation of repair data, the method comprising:
   receiving, by a computer apparatus, a first vehicle damage image associated with an electronic claim for a damaged vehicle;
   determining, by the computer apparatus, one or more damaged components on the damaged vehicle by:
      providing the first vehicle damage image to a first generated artificial intelligence model, wherein the first generated artificial intelligence model has been trained using prior vehicle damage images;
   determining, by the computer apparatus, a damage severity value associated with the one or more damaged components on the damaged vehicle by performing a heat map analysis on the first vehicle damage image, wherein the damage severity value corresponds with a shade illustrated in a heat map;
   determining, by the computer apparatus, a first repair-or-replace designation of the one or more damaged components on the damaged vehicle by:
      providing the first vehicle damage image and the damage severity value to a second generated artificial intelligence model,
      wherein the first generated artificial intelligence model and the second generated artificial intelligence model correspond with different aspects of the automated estimation of repair data, and
      wherein the first repair-or-replace designation indicates whether the one or more damaged components should be repaired or replaced;
   providing, by the computer apparatus, the first repair-or-replace designation to a graphical user interface of a claims management device;
   upon providing the first repair-or-replace designation to the claims management device, receiving, by the computer apparatus and from the claims management device, an adjustment request to change the first repair-or-replace designation, wherein the adjustment request comprises a second vehicle damage image that is different than the first vehicle damage image and the second vehicle damage image is associated with the electronic claim;
   based on the adjustment request, determining, by the computer apparatus, a second repair-or-replace designation of the one or more damaged components on the vehicle by:
      providing the second vehicle damage image and the damage severity value to the second generated artificial intelligence model; and
   providing, by the computer apparatus, the second repair-or-replace designation to the graphical user interface of the claims management device.

2. The method as set forth in claim 1 further comprising: refining, by the computer apparatus, the second generated artificial intelligence model, wherein the refining comprises:
   applying learning from the prior vehicle damage images to the second generated artificial intelligence model;
   receiving training images at different angles for the first vehicle;
   orienting the training images irrespective of underlying damage or no damage;
   applying one or more transformation functions to the training images, wherein the second generated artificial intelligence model presents an understanding of how much orientation of the training images occurred irrespective of the underlying damage of no damage;
   obtaining, by the computer apparatus, repair data associated with the training images for the damaged vehicle; and
   training, by the computer apparatus, the second generated artificial intelligence model by correlating the training images to the repair data.

3. The method as set forth in claim 1 wherein the second generated artificial intelligence model is trained and refined by using a deep neural network architecture.

4. The method as set forth in claim 1 further comprising: determining, by the computer apparatus, when an adjustment to repair data is required based on an input received from the claims management device.

5. The method as set forth in claim 4 further comprising:
   receiving, by the computer apparatus, one or more changes to the repair data when the adjustment is determined to be required;
   revising, by the computer apparatus, the repair data based on the received one or more changes; and
   providing, by the computer apparatus, the revised repair data to the claims management device.

6. The method as set forth in claim 1 wherein a heat map is generated as a graphical representation of a localized area of the one or more damaged components used to identify the damage severity value and a corresponding operation code.

7. The method as set forth in claim 1, wherein the heat map of the heat map analysis is determined after training of the first generated artificial intelligence model and the second generated artificial intelligence model completes.

8. The method as set forth in claim 1, wherein the adjustment request is associated with estimated labor hours and the estimated labor hours are provided to the graphical user interface of the claims management device.

9. The method as set forth in claim 1, wherein the adjustment request is associated with an operation code identifying a panel of the vehicle and the operation code is provided to the graphical user interface of the claims management device.

10. A non-transitory computer readable medium having stored thereon instructions for automated estimating of repair data comprising executable code, which when executed by a processor, cause the processor to:
receive a first vehicle damage image associated with an electronic claim for a damaged vehicle;
determine one or more damaged components on the damaged vehicle by:
providing the first vehicle damage image to a first generated artificial intelligence model, wherein the first generated artificial intelligence model has been trained using prior vehicle damage images;
determine a damage severity value associated with the one or more damaged components on the damaged vehicle by performing a heat map analysis on the first vehicle damage image, wherein the damage severity value corresponds with a shade illustrated in a heat map;
determine a first repair-or-replace designation of the one or more damaged components on the damaged vehicle by:
providing the first vehicle damage image and the damage severity value to a second generated artificial intelligence model,
wherein the first generated artificial intelligence model and the second generated artificial intelligence model correspond with different aspects of the automated estimation of repair data,
wherein the first generated artificial intelligence model is used to train the second generated artificial intelligence model, and
wherein the first repair-or-replace designation indicates whether the one or more damaged components should be repaired or replaced;
provide the first repair-or-replace designation to a graphical user interface of a claims management device;
upon providing the first repair-or-replace designation to a graphical user interface of the claims management device, receiving, from the claims management device, an adjustment request to change the first repair-or-replace designation, wherein the adjustment request comprises a second vehicle damage image that is different than the first vehicle damage image and the second vehicle damage image is associated with the electronic claim;
based on the adjustment request, determining a second repair-or-replace designation of the one or more damaged components on the vehicle by:
providing the second vehicle damage image and the damage severity value to the second generated artificial intelligence model; and
providing the second repair-or-replace designation to the graphical user interface of the claims management device.

11. The non-transitory computer readable medium as set forth in claim 10 further causing the processor to:
refine the second generated artificial intelligence model, wherein the refining comprises:
applying learning from the prior vehicle damage images to the second generated artificial intelligence model;
receiving training images at different angles for the first vehicle;
orienting the training images irrespective of underlying damage or no damage;
applying one or more transformation functions to the training images, wherein the second generated artificial intelligence model presents an understanding of how much orientation of the training images occurred irrespective of the underlying damage of no damage;
obtaining repair data associated with the training images for the first damaged vehicle; and
training the second generated artificial intelligence model by correlating the training images to the repair data.

12. The non-transitory computer readable medium as set forth in claim 10 wherein the second generated artificial intelligence model is iteratively trained and refined by using a deep neural network architecture.

13. The non-transitory computer readable medium as set forth in claim 10 further comprising:
determining when an adjustment to the determined repair data is required based on an input received from the claims management device.

14. The non-transitory computer readable medium as set forth in claim 13 further comprising:
receiving one or more changes to the repair data when the adjustment is determined to be required;
revising the repair data based on the received one or more changes; and
providing the revised repair data to the claims management device.

15. The non-transitory computer readable medium as set forth in claim 10 wherein the heat map analysis is generated from a heat map as a graphical representation of a localized area of the one or more damaged components used to identify the damage severity value and a corresponding operation code.

16. A repair management computer apparatus for automated estimation of repair data comprising:
a processor; and
a memory coupled to the processor which is configured to be capable of executing programmed instructions comprising and stored in the memory to:
receive a first vehicle damage image associated with an electronic claim for a damaged vehicle;
determine one or more damaged components on the damaged vehicle by:
providing the first vehicle damage image to a first generated artificial intelligence model, wherein the first generated artificial intelligence model has been trained using prior vehicle damage images;
determine a damage severity value associated with the one or more damaged components on the damaged vehicle by performing a heat map analysis on the first vehicle damage image, wherein the damage severity value corresponds with a shade illustrated in a heat map;
determine a first repair-or-replace designation of the one or more damaged components on the damaged vehicle by:
providing the first vehicle damage image and the damage severity value to a second generated artificial intelligence model,
wherein the first generated artificial intelligence model and the second generated artificial intelligence model correspond with different aspects of the automated estimation of repair data, and wherein the first repair-or-replace designation indicates whether the one or more damaged components should be repaired or replaced;

provide the first repair-or-replace designation to a graphical user interface of a claims management device;

upon providing the first repair-or-replace designation to a graphical user interface of the claims management device, receive, from the claims management device, an adjustment request to change the first repair-or-replace designation, wherein the adjustment request comprises a second vehicle damage image that is different than the first vehicle damage image and the second vehicle damage image is associated with the electronic claim;

based on the adjustment request, determine a second repair-or-replace designation of the one or more damaged components on the vehicle by:

provide the second vehicle damage image and the damage severity value to the second generated artificial intelligence model; and provide the second repair-or-replace designation to the graphical user interface of the claims management device.

17. The repair management computer apparatus as set forth in claim 16 wherein the processor is further configured to be capable of executing the stored programmed instructions to refine the second generated artificial intelligence model, wherein the refining comprises:

applying learning from the prior vehicle damage images to the second generated artificial intelligence model;

receiving training images at different angles for the first vehicle;

orienting the training images irrespective of underlying damage or no damage;

applying one or more transformation functions to the training images, wherein the second generated artificial intelligence model presents an understanding of how much orientation of the training images occurred irrespective of the underlying damage of no damage;

obtaining repair data associated with the training images for the damaged vehicle; and training the second generated artificial intelligence model by correlating the training images to the repair data.

18. The repair management computer apparatus as set forth in claim 16 wherein the second generated artificial intelligence model is iteratively trained and refined by using a deep neural network architecture.

19. The repair management computer apparatus as set forth in claim 16 wherein the processor is further configured to be capable of executing the stored programmed instructions to determine when an adjustment to repair data is required based on an input received from the claims management device.

20. The repair management computer apparatus as set forth in claim 19 wherein the processor is further configured to be capable of executing the stored programmed instructions to:

receive one or more changes to the repair data when the adjustment is determined to be required;

revise the repair data based on the received one or more changes; and provide the revised repair data to the claims management device.

21. The repair management computer apparatus as set forth in claim 16 wherein the heat map analysis is generated from a heat map as a graphical representation of a localized area of the one or more damaged components used to identify the damage severity value and a corresponding operation code.

* * * * *